Figure 1:
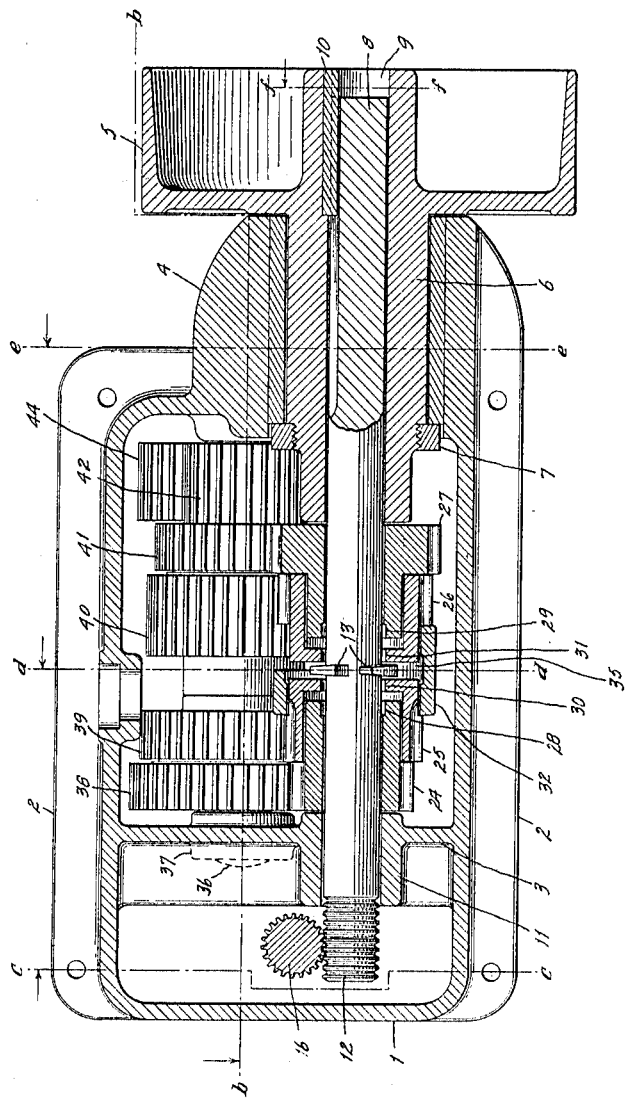

G. W. SMITH.
VARIABLE SPEED GEARING.
APPLICATION FILED OCT. 30, 1911.

1,066,764.

Patented July 8, 1913.
3 SHEETS—SHEET 1.

Witnesses:
W. L. Dow.
E. Behel

Inventor:
George W. Smith
By A. O. Behel
Atty.

G. W. SMITH.
VARIABLE SPEED GEARING.
APPLICATION FILED OCT. 30, 1911.
1,066,764.
Patented July 8, 1913.
3 SHEETS—SHEET 2.
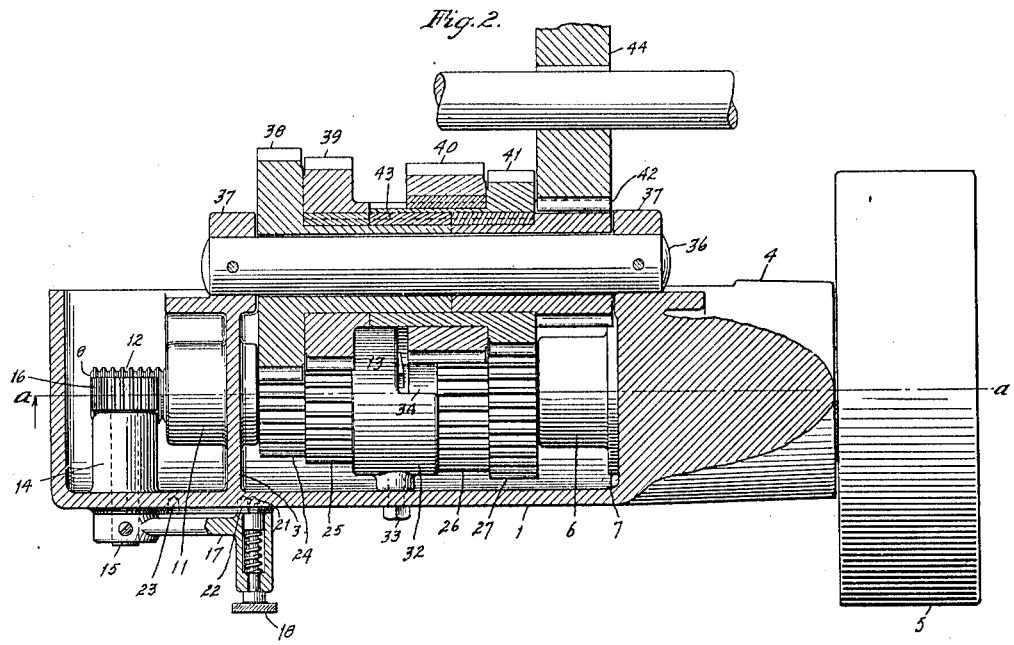
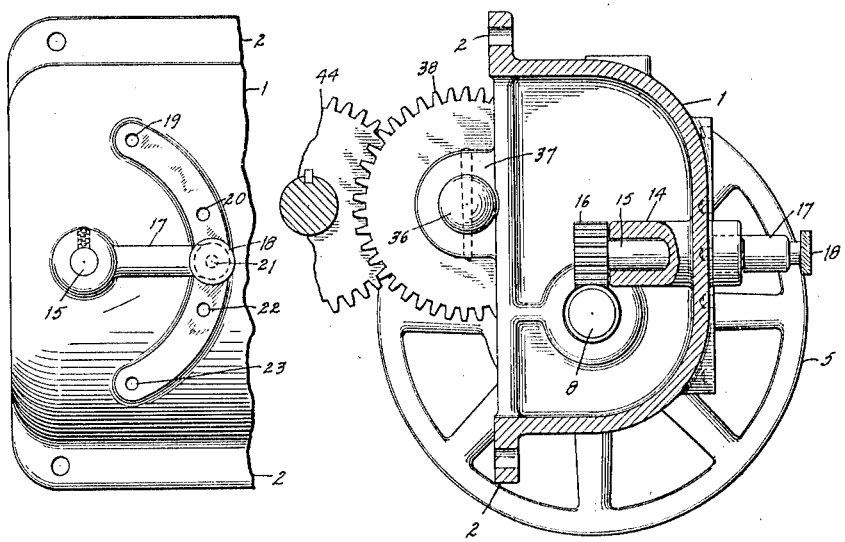
Witnesses:
W. L. Dow.
E. Behel.
Inventor:
George W. Smith
By A. O. Behel
Atty.

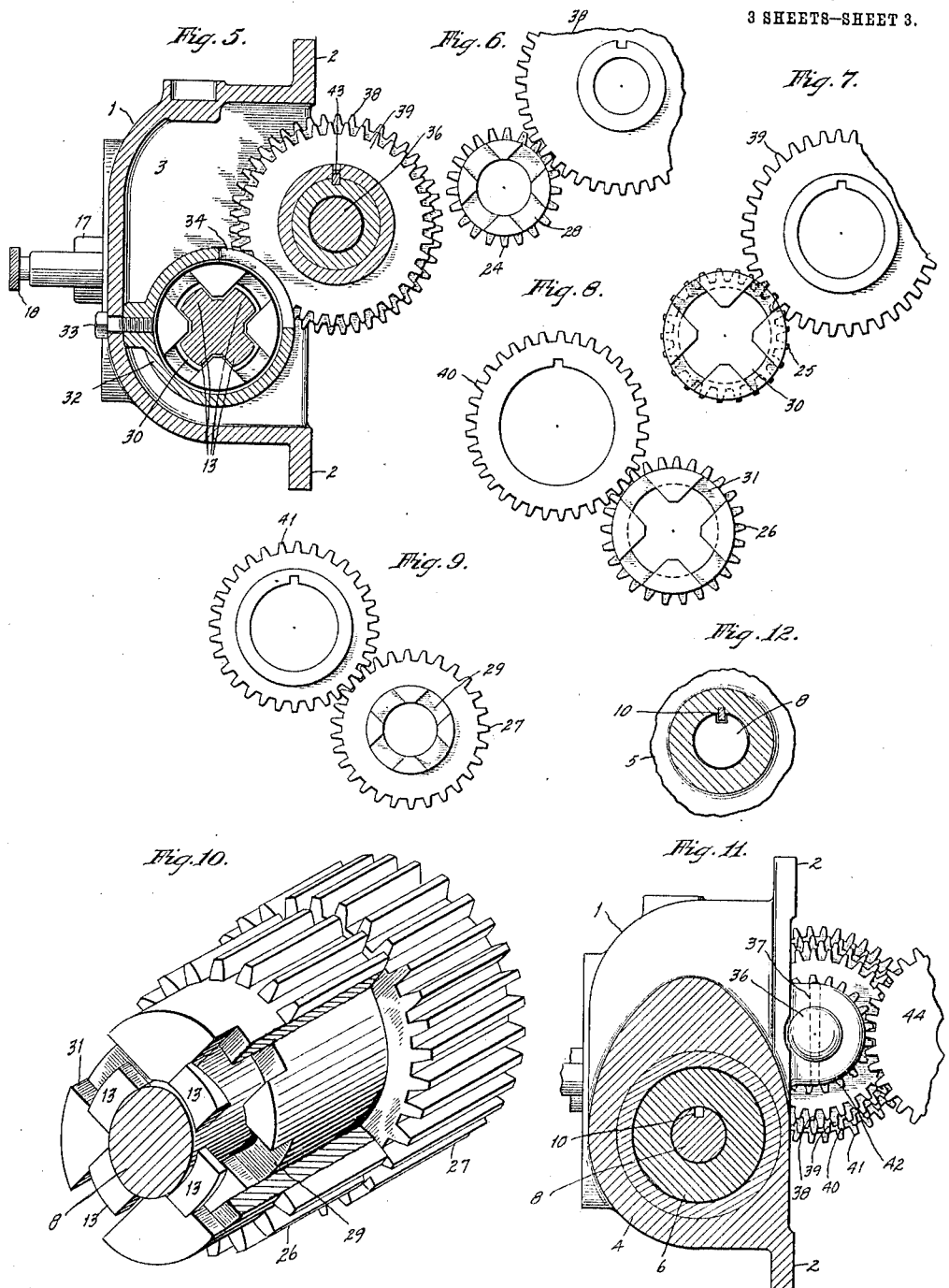

UNITED STATES PATENT OFFICE.

GEORGE W. SMITH, OF ROCKFORD, ILLINOIS, ASSIGNOR TO THE INGERSOLL MILLING MACHINE COMPANY, OF ROCKFORD, ILLINOIS, A CORPORATION OF ILLINOIS.

VARIABLE-SPEED GEARING.

1,066,764.  Specification of Letters Patent.  Patented July 8, 1913.

Application filed October 30, 1911. Serial No. 657,672.

*To all whom it may concern:*

Be it known that I, GEORGE W. SMITH, a citizen of the United States, residing at Rockford, in the county of Winnebago and State of Illinois, have invented certain new and useful Improvements in Variable-Speed Gearing, of which the following is a specification.

The object of this invention is to construct a speed gearing in which different speeds can be had.

In the accompanying drawings, Figure 1 is a section on line a a Fig. 2. Fig. 2 is a section on line b b Fig. 1. Fig. 3 is an elevation of a portion of the casing showing the shifting lever. Fig. 4 is a section on line c c Fig. 1. Fig. 5 is a section on line d d Fig. 1. Fig. 6 is a face representation of the gears 24 and 38 showing the clutch face of the gear 24. Fig. 7 is a face representation of the gears 25 and 39 showing the clutch face of the gear 25. Fig. 8 is a face representation of the gears 26 and 40 showing the clutch face of the gear 26. Fig. 9 is a face representation of the gears 27 and 41 showing the clutch face of the gear 27. Fig. 10 is a perspective view of the gears 26 and 27 showing their clutch faces, also showing the clutch. Fig. 11 is a section on line e e Fig. 1. Fig. 12 is a section on line f f Fig. 1.

From the casing 1 extends the flange 2 and the casing has a partition 3 near one end and a bearing 4 at its other end. A driving pulley 5 has a hub 6 located within the bearing 4 and held against endwise movement by the collar 7, but free to rotate. A shaft 8 is located within the central opening 9 of the driving pulley 5 and hub 6, and is connected with the pulley by the key 10 in a manner to allow the shaft to have a lengthwise sliding movement and still be rotated by the pulley. This shaft is supported also by a bearing 11 in the partition 3. The free end of the shaft 8 is formed with concentric grooves 12, and this shaft has, in this instance, four radially extending projections 13.

A bearing 14 extends inwardly from the casing 1 and supports a short shaft 15, to one end of which is secured a spur pinion 16, and to its other end is secured a lever 17. The spur pinion 16 meshes with the teeth formed by the grooves 12 in the shaft 8. The lever 17 supports a spring actuated plunger 18 which enter the recesses 19, 20, 21, 22 and 23. By moving the lever 17, the spur pinion 16 will be oscillated which will move the shaft 8 lengthwise and hold it in such position. As the grooves 12 are annular, the shaft 8 can rotate while being held by the spur gear 16.

On the shaft 8 between the bearing 11 and hub 6, are located four spur gears 24, 25, 26 and 27, so that they can rotate independently and at different speeds. The spur gear 24 has a clutch face 28, the spur gear 27 has a clutch face 29, and the spur gears 25 and 26 have clutch sections 30 and 31 respectively. The spur gear 25 overrides a portion of the spur gear 24, and the spur gear 26 overrides a portion of the spur gear 27, as shown at Fig. 1. A ring 32 is secured in connection with the casing by the screw 33, and this ring has a cut-away section 34. This ring is located between the teeth of the spur gears 25 and 26 and serve to hold these gears separated, thereby leaving a space 35 between them, as shown at Fig. 1. The projections 13 extending from the shaft 8 when in their neutral position will stand in the space 35 and will rotate therein, at the same time allowing the gears 24, 25, 26 and 27 to remain at rest. By moving the shaft 8 lengthwise, the projections 13 may be moved into engagement with the clutch faces of any one of the gears 24, 25, 26 and 27, thereby forming a connection between the selected gear and the shaft, so that a rotative movement may be imparted to the gear from the shaft.

A shaft 36 is fixedly supported by the bearings 37 forming a part of the casing 1 and on this shaft are loosely mounted five spur gears 38, 39, 40, 41 and 42 but all being connected by the keys 43 so that they will rotate together. The spur gears 24, 25, 26 and 27 mesh with the spur gears 38, 39, 40 and 41 respectively. A driven gear 44 may be supported in any suitable manner and meshes with the spur gear 42. When a connection is made between the shaft 8 and any one of the gears 24, 25, 26 and 27, the rest of the gears will be rotated idly on the shaft 8, as all of the gears 38, 39, 40, 41 and 42 rotate in unison.

It is evident that the driven gear 44 might mesh with any of the gears 38, 39, 40 and 41, or a driven gear might mesh with each of said gears.

By moving the lever 17 so that the plunger 18 will be located in the recess 19 a connection will be made between the shaft 8 and the gear 27. When placed in the recess 20, a connection will be made with the gear 26. When placed in the recess 22, a connection will be made with the gear 25. When placed in the recess 23, a connection will be made with the gear 24, and when placed in the recess 21, the shaft 8 will be free to rotate without engagement with any of the gears. By this arrangement four different speeds can be obtained.

I claim as my invention:

In mechanism of the character set forth, the combination with a case, of driving and driven shafts journaled in the case, a plurality of gears fixed to one shaft, gears coöperating with the fixed gears and loose on the other shaft, said loose gears comprising two groups, the groups being spaced apart, the different gears of one group having clutch elements arranged together on one side of the space between the groups, the gears of the other group having a plurality of clutch elements arranged together on the opposite side of the space, a clutch element carried by the shaft on which the loose gears are mounted and operating in the space between the groups and into and out of coaction with the different clutch elements, and a device carried by the case and interposed between the groups of gears, to hold the same in spaced relation.

In testimony whereof I have hereunto set my hand in presence of two subscribing witnesses.

GEORGE W. SMITH.

Witnesses:
A. O. BEHEL,
E. D. E. N. BEHEL.

---

Copies of this patent may be obtained for five cents each, by addressing the "Commissioner of Patents, Washington, D. C."